Oct. 18, 1966 — F. E. OBERMAIER ET AL — 3,279,698
DOUBLE PORT WATERLINE THERMOSTAT
Filed June 30, 1964 — 2 Sheets-Sheet 1
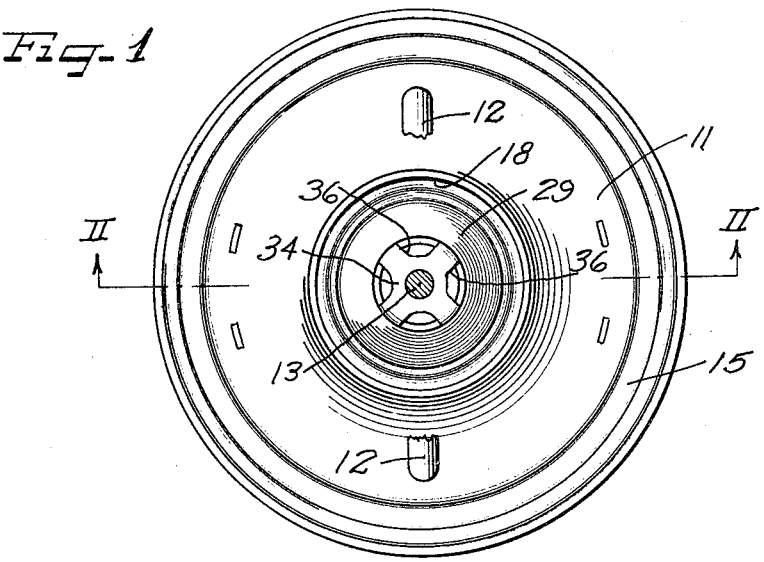
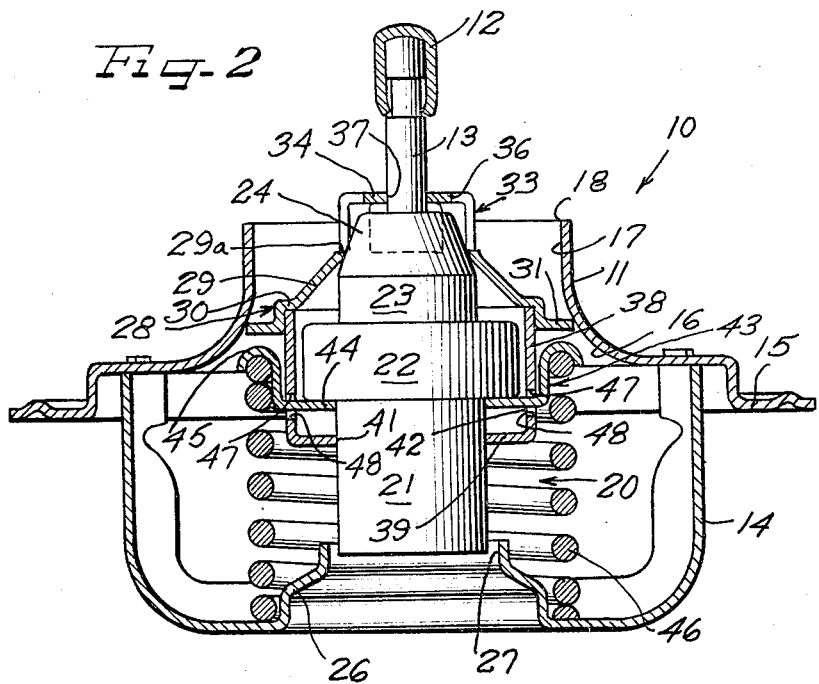
INVENTORS
Frank E. Obermaier
Douglas E. Kelly
BY *Hill, Sherman, Meroni, Gross & Simpson* ATTORNEYS

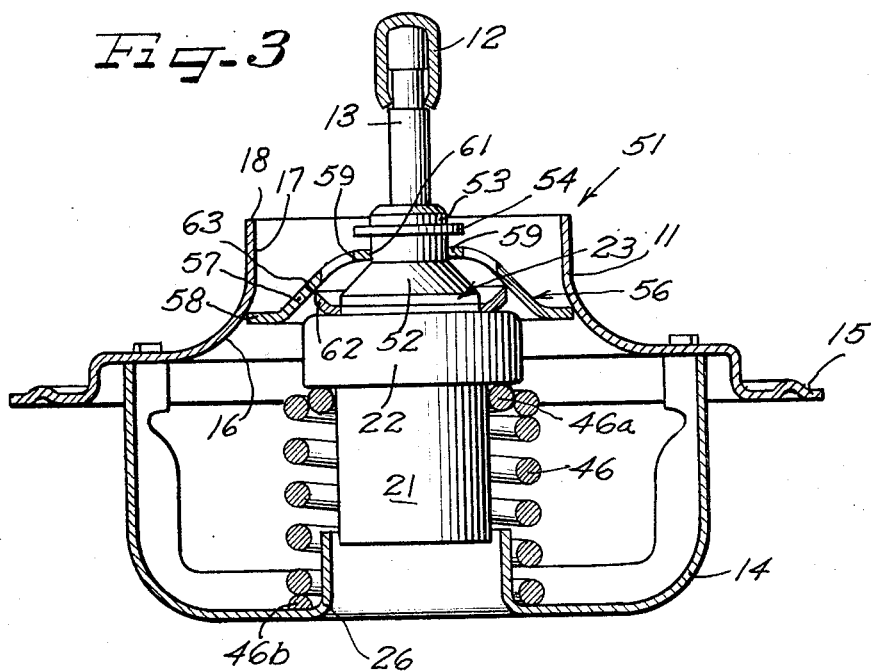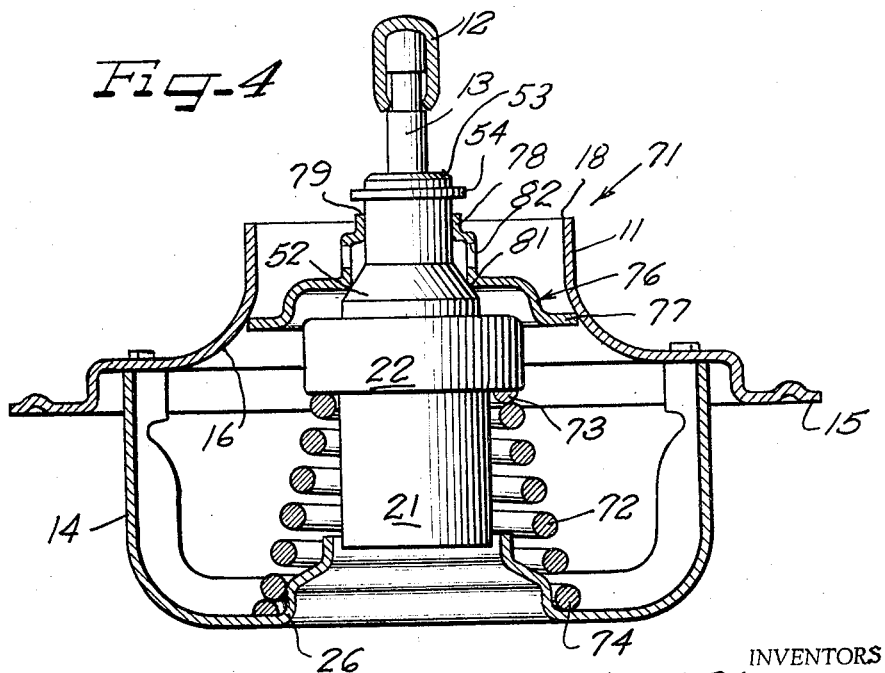

United States Patent Office 3,279,698
Patented Oct. 18, 1966

1

3,279,698
DOUBLE PORT WATERLINE THERMOSTAT
Frank E. Obermaier, Park Ridge, and Douglas E. Kelly,
Northfield, Ill., assignors to The Dole Valve Company,
Morton Grove, Ill., a corporation of Illinois
Filed June 30, 1964, Ser. No. 379,200
2 Claims. (Cl. 236—34)

This invention generally relates to waterline thermostats and more particularly relates to a poppet-type double port waterline thermostat wherein the small port means is opened prior to opening the main flow port means.

Due to the techniques presently utilized to manufacture automotive engines, the engines are assembled and placed in operative conditions with fine particles of coarse sand and other particles in their internal system. The coarse sand problem has been believed to cause the engines and their cooling system to have a low operating temperature in the winter. Also, the large automotive engines and their corresponding cooling systems which are to be utilized during the summer months for air conditioning and the like encounter a problem with temperature-overshooting by the waterline thermostat due to frequent cycling of the thermostat during the operation of the engine.

The present invention substantially eliminates or reduces the problems of known waterline thermostats by providing a waterline thermostat with a double port means with one port means having a smaller flow area than another main port but the smaller secondary port means being capable of handling particle sizes three to four times larger than the main port means for a given degree of movement by the temperature sensitive element. Further, the waterline thermostat of the present invention substantially eliminates unnecessary cycling and provides the waterline thermostat with finer control by allowing the whole temperature element casing to be exposed to the hot fluid when the thermostat is both opened and closed and also reduces the pressure sensitivity of the waterline thermostat by providing a small secondary port.

Therefore, it is an object of the present invention to provide a double ported waterline thermostat.

It is another object of the present invention to provide a double ported waterline thermostat having a small secondary port means and a large main port with the small port being capable of handling particles three to four times larger than particles which may be handled by the large port.

It is another object of the present invention to provide a double ported waterline thermostat wherein the one port means has a flow area smaller than the other port means and said small port means is capable of handling particles three to four times larger than can be passed through the larger port means.

It is another object of the present invention to provide the temperature element casing of the waterline thermostat with maximum liquid exposure.

It is another object of the present invention to provide a waterline thermostat having a plurailty of ports with the flow of fluid through said ports being controlled by the same valve means.

It is another object of the present invention to provide a waterline thermostat having a plurality of secondary ports and a main port with one floating poppet valve controlling fluid flow through the secondary and main ports.

2

These and other objects, features, and advantages of the present invention will become apparent from a careful consideration of the following detailed description, when considered in conjunction with the accompanying drawings illustrating preferred embodiments of the present invention, and wherein like reference numerals and characters refer to like and corresponding parts throughout the several views therein.

In the drawings:

FIGURE 1 is a top elevational view with parts in cross-section of a waterline thermostat constructed in accordance with the principles of the present invention;

FIGURE 2 is an enlarged vertical-sectional view with parts in elevation of the waterline thermostat constructed in accordance with the principles of the present invention and taken along lines II—II of FIGURE 1;

FIGURE 3 is an enlarged vertical-sectional view illustrating another embodiment of a waterline thermostat constructed in accordance with the principles of the present invention; and FIGURE 4 is an enlarged vertical-sectional view with parts in elevation illustrating still another embodiment of a waterline thermostat constructed in accordance with the principles of the present invention.

As shown in the drawings:

The present invention provides a waterline thermostat with a floating poppet valve slidably mounted on the thermostat power unit in such a manner as to expose a substantially large area of the power unit to a coolant. The larger the exposed power unit area is, the greater will be the accuracy of temperature control by the power unit.

The thermostat of the present invention has a large main flow port which is formed by a neck of a ported transverse wall. The flow of liquid through the main port is controlled by the poppet valve which has an out-turned flange portion engageable with the interior of the transverse wall neck to open and close the main port. The poppet valve is provided with at least one secondary flow port with said secondary flow port having a flow area less than the flow area of the main flow port. The poppet valve is positionable to prevent coolant from flowing through the secondary and main ports and is designed to open in steps to permit liquid coolant to flow through the secondary ports prior to flowing through the main flow port. Further, the secondary port and poppet valve are constructed such that the opening of the secondary port by the poppet valve will allow particles to flow therethrough having a size four to five times greater than particles that would be allowed to pass through the main flow port for that same degree of movement of the temperature sensitive element of the waterline thermostat.

Referring to FIGURES 1 and 2, a double ported waterline thermostat 10 is shown as comprising a ported transverse wall 11 having a stirrup 12 extending therefrom and a power member 13 rockably mounted thereon. A combination of power unit guide and spring support or base wall piece 14 is connected to the transverse wall 11 opposite the stirrup 12. The stirrup 12 and base wall 14 are fixed to the transverse wall 11 by peening over the ends thereof which protrude through apertures in the wall 11.

The transverse wall 11 has a flange 15 extending therearound which provides a means for mounting the thermostat in a fluid conduit so that the thermostat can control the passage of liquid therethrough.

The transverse wall 11 has a neck 16 formed integrally therewith which interconnects the horizontal portion of the wall with a straight wall throat 17 which in turn terminates in a first main port 18.

A temperature sensitive power unit 20 is of the well known "solid-fill" type and comprises a temperature sensitive portion 21, a collar 22, a power member guide portion 23, and the power member 13. The thermostat contains a fusible thermally expansible material within the temperature sensitive portion 21 which expands when the ambient temperature rises to or above the critical temperature of the expansible material. The expansible material acts against a diaphragm within the power unit which, in turn, abuts or is connected to the power member 13 so that heating of the temperature sensitive portion 21 above the critical temperature of the expansible material contained therein will effect relative extensible movement of the power member 13 from the casing of the power unit. For the purposes of simplicity, that portion of the power unit 20 which includes a temperature sensitive portion 21, the collar 22, and the guide portion 23 is referred to as the casing. The guide portion 23 has a top frusto-conical end 24.

The base wall 14 has an upturned spring guide portion 26 extending centrally thereof in the direction of the port 18 with the spring guide portion 26 being apertured as at 27 to provide a guide for the power unit temperature sensitive portion 21.

A floating poppet valve member 28 includes a frusto-conical wall 29 having integral therewith a shoulder portion 30 and an outturned flange 31 extending from the base of said shoulder 30. The periphery of the outturned flange 31 is engageable with the curvilinear neck 16 to form a first valve portion to control the flow of liquid therebetween and through the port 18.

An annular valve surface 29a is formed at the apex of the frusto-conical wall 29 at the junction of that wall and the ported cylindrical configurated wall 33 and this valve surface is engageable with canted walls 24 of the power unit to control the flow of liquid therebetween. The valve surface 29a is sometimes hereafter referred to as a second valve portion. The cylindrically configurated wall has a plurality of parts 36 formed therein and has an end wall 34 which is apertured at 37 to slidably engage the power member 13 and to act as a top guide for the floating valve member 28. The plurality of ports 36 are utilized to allow fluid to pass therethrough and are hereinafter described collectively as the secondary port and have a combined flow area less than the flow area of the main port 18.

Fixed to the inner end of the valve 28, by suitable means such as welding, is a bottom cylindrical guide 38 extending from the shoulder portion 30 toward the base wall spring guide 26. The guide 38 has an inturned base wall 39 provided with an aperture 41 which slidably engages the temperature sensitive portion 21 to slidably guide the valve member 28. The guide 38 has a pair of diametrically opposed slots 42 having top end walls 47 spaced a predetermined distance apart from the bottom end walls 48. Passing through the slots 42 is a spring guide 43. The spring guide 43 has a portion 44 adapted to engage the upstream end of the power unit collar 22 and a curved flange portion 45 adapted to engage one end of a compression spring 46. The width of the apertures 42 are such that when the thermostat is fully closed, as is illustrated in FIGURE 2, the spring guide portion 42 will have its downstream surface spaced slightly from the top ends 47 and its upstream surface spaced a predetermined distance from the bottom ends 48. Therefore, the spring 46 will urge the valve surface 29a of the poppet valve 28 to a seated position on the canted surface 4 of the power unit and will bias the flange 31 to a seated position on the curved neck 16.

In operation, the thermostat is mounted on the engine block to control the flow of coolant from the engine block to the radiator where it is cooled. The thermostat 10 has its valve guide 38 spaced from the walls of the power unit casing such that the coolant within the engine block will surround nearly the entire casing of the power unit by flowing through the apertures 42 through the spaces between guide 38 and the power unit. By allowing nearly all of the power unit casing to be immersed in the coolant, there is thereby provided a system which is more accurately responsive to the varying temperatures of the coolant. When the temperature of the coolant at the upstream end of the thermostat 10 has reached a predetermined temperature the temperature sensitive substance contained within the temperature sensitive portion 21 will expand and cause the casing and power member 13 to move axially relative to one another. The power member is prevented from moving axially by the stirrup 12 and accordingly, the power unit casing will back off from the stirrup 12. As the casing backs away from the stirrup, the first valve portion 29a will be unseated from the frusto-conical power unit guide portion 24 to permit coolant within the engine block to pass therebetween and out of the secondary flow port 36 and into the radiator. As the power unit casing continues to back off, the collar 22 moves the spring guide 45 toward the spring guide 26 and allows the spring guide 45 to contact the aperture end walls 48 and thereby urge the valve guide 38 downwardly toward the spring guide 26. As the valve guide 38 is urged downwardly, the main valve flange 31 will be unseated from the neck 16 to permit the coolant to flow therebetween and out the port 18 to the radiator. It will be noted that the annular valve surface 29a is unseated first while the valve portion 31 remains closed. The valve portion 31 remains closed until the power unit collar moves the spring guide 45 into engagement with the end walls 48 of the aperture 42, the aperture end walls 48 being spaced a predetermined distance from the upstream end surface of the spring guide 45. Waterline thermostats of the single port variety must be designed so as to be capable of handling high flow rates under hot-engine conditions but such thermostats necessarily have a relatively large flow port and a correspondingly larger valve member with the result that slight movement of the valve member away from its seat permits a relatively large quantity of fluid to flow through the valve. Under these circumstances, a good part of the time the valve member simply moves from the fully closed to the slightly open position and no means are provided for flushing the conduit upstream of the valve of its foreign particles. With the thermostat of the instant invention, particle flushing takes place even for small degrees of movement of the power unit and yet a second, larger valve member is provided which is capable of handling high flow rates.

The valve 28 is a floating type poppet valve and is guided for its axial movement on both its upstream and downstream end by the guides 38 and 34, respectively. It is further noted that the coolant will flow past both the valve portions 31 and 29a when the thermostat is in its fully open condition. By allowing the coolant to flow past both valve portions the coolant completely surrounds the power unit casing when the thermostat is in a fully open condition. By completely enveloping the power unit casing in flowing coolant and by allowing the secondary inner port to be opened first, premature breakdown of the thermostat due to extreme pressure differentials and also premature cycling—that is closing the opening of the valve 28, are substantially prevented.

Referring to FIGURE 3 there is illustrated another waterline thermostat 51 constructed in a similar manner to the waterline thermostat 10. The waterline thermostat 51, however, has a power member guide 23 with a central frusto-conical portion 52 and a top cylindrical guide portion 53 extending from the apex of the frusto-conical portion 52. The top cylindrical guide portion 53 has affixed thereto a collar or cylindrical flange member 54. A helical compression spring 46 has one end 46a connected to the upstream end of the collar 22 and its other end 46b connected to the spring guide portion 26 of the base wall 14 with the helical compression spring 46 encircling the power unit temperature sensitive portion 21.

The waterline thermostat 51 has a floating poppet valve 56 having a frusto-conical central section 57 with an outwardly extending flange 58 extending outwardly from the base portion of the central section 57 and a rounded guide portion 59 extending inwardly from the apex of the frusto-conical section 57. The flange 58 forms the first valve portion of the valve 56 by cooperating with the curvilinear neck 16 to open and close the flow of coolant therebetween to the port 18. The mounted guide portion has a plurality of ports 59 hereinafter referred to collectively as the secondary flow port, which port has a flow area less than the flow area of the main flow port 18, and an aperture 61 adapted to slidably receive the power unit guide portion 53. The apertured portion of valve 56 is spaced a predetermined distance from the power unit guide collar 54 when the thermostat 51 is closed. A cylindrical cup-shaped member 62 is mounted on the downstream end of the power unit collar 22 and flares upwardly in a downstream direction. The cup-shaped member 52 cooperates with the conical surface of the valve 56 to form the second valve portion indicated at 63 for the valve 56 upstream of the secondary port 59. The first and second valve portions of the valve 56 are maintained in a closed position by the spring 46 and also by the liquid pressure at the upstream end of the valve 56 and, when there is a small flow of liquid through the ports 59, by the velocity head of the liquid.

In operation, when the temperature sensitive portion 21 senses the critical temperature, the power unit casing is moved toward the spring guide 26 and the second valve portion 63 is open by unseating the second valve portion 63 of the valve 56 from the cup-shaped member 62. Liquid coolant is permitted to pass therebetween and out of the secondary port 59. After a short distance, the power unit guide collar 54 contacts the end of the valve 56 and continued upstream motion of the power unit casing and guide 54 causes the first valve portion 58 to open by unseating the flange 58 from the neck 16 to permit coolant to flow therebetween and out of the port 18. By utilizing the ported valve 51, the plurality of ports 59 being considered as a single flow port, backup pressure is substantially reduced and the operating life of the thermostat is increased, as was described supra. Further, the second valve portion 63 is arranged such that it allows larger particles to pass therethrough than are allowed to pass through the first valve portion 58 per unit axial movement of the power unit casing.

Referring to FIGURE 4 there is illustrated another thermostat 71 illustrating another embodiment of the present invention. The thermostat 71 is similar to the thermostat 51 and utilizes a frusto-conical compression spring 72 having one end 73 abutting against the upstream end of the power unit collar 22 and its other end 74 abutting against the base wall spring guide portion 26. The waterline thermostat 71 has a floating poppet valve 76 having an outwardly extending flange 77 forming a first valve portion, and a cylindrical guide portion 78 at its downstream end which is slidably mounted on the power unit guide portion 53 with its end 79 spaced a predetermined distance from the power unit guide collar 54. The valve 56 has a second valve portion 81 which is adapted to engage frusto-conical power unit guide portion 52 to prevent the flow of liquid coolant therebetween when the thermostat is in its closed position. A plurality of ports 82 are formed in the valve 76 downstream of the second valve portion 81 to form a secondary flow port with the flow port 18 forming the main flow port for the thermostat 71. The liquid pressure at the upstream end of the valve 76 and the spring 72 maintain the thermostat in its closed position with the valve portions 77 and 81 closed. When the ambient temperature of the coolant rises above a critical temperature, the power unit casing is axially moved towards the spring guide 26 such that the second valve portion 81 is unseated from the power unit guide conical section 52 to allow liquid coolant to flow therebetween and out of the secondary ports 82 while the first valve portion 77 is closed. Continued downward motion of the power unit casing provides contact between the valve end wall 79 and the power unit guide collar 54 to allow the collar to urge the valve 76 downward toward the spring guide 26 to also unseat the first valve portion 77 from the neck 16 to allow coolant to flow therebetween and out of the port 18. The continued flow of coolant through both the main and secondary flow ports envelopes a major portion of the power unit casing to provide for accurate temperature sensing thereof. A double port thermostat is thereby provided wherein a first valve acts initially to control the flow of liquid through a first port and a second valve acts subsequently, as coolant temperatures ambient the power unit rise to control the rate of flow of liquid through a second, relatively larger port. Flushing is achieved by operation of the first valve member which provides a relatively large flow area for a given degree of relative movement between the power member and its associated casing.

It will be understood of course that these embodiments of my invention have been used for illustrative purposes only and that various modifications and variations in the present invention may be effected without departing from the spirit and scope of the present invention as is set forth in the hereunto appended claims.

We claim as our invention:

1. A reverse poppet thermostat comprising:
   a transverse wall having a main flow port formed therein,
   a stirrup and a base wall affixed to said transverse wall and extending upstream and downstream thereof, respectively,
   said base wall having a guide portion,
   a power unit having a power member contacting said stirrup and a thermally extensible casing extending through said guide portion,
   a collar formed about said casing,
   a valve member disposed about said collar and slidably contacting said casing and said power member,
   said valve member having a secondary port formed in the vicinity of said power member and having a first portion cooperable with said transverse wall for controlling the flow through said main port and having a second portion cooperable with said casing for controlling the flow through said second port,
   a slot formed within said valve member,
   a spring guide contacting the upstream side of said collar and extending through said slot for receiving a compression spring thereby, and
   a compression spring disposed between said spring guide and said base wall.

2. A reverse poppet thermostat comprising:
   a transverse wall having a main flow port formed therein,
   a stirrup and a base wall affixed to said transverse wall and extending upstream and downstream thereof, respectively,
   said base wall having a guide portion,
   a power unit having a power member contacting said stirrup and a thermally extensible casing extending through said guide portion,
   a first valve member slidably received about said casing and being cooperable with said transverse wall for controlling the flow of fluid through said main port,
   said first valve member having a secondary port formed in the vicinity of said casing,
   a second valve member fixedly supported about said casing and being cooperable with said first valve member for controlling the flow of fluid through said secondary port, a central flange affixed to said casing downstream of said first valve member and spaced therefrom when said power unit is fully retracted, said central flange contacting said first valve member immediately adjacent said casing upon a temperature rise ambient said casing.

References Cited by the Examiner

UNITED STATES PATENTS

| | | | |
|---|---|---|---|
| 2,137,136 | 11/1938 | Giesler | 236—34 |
| 2,873,070 | 2/1959 | Drapeau | 236—34 |
| 2,926,853 | 3/1960 | Wood | 236—34 |
| 3,172,602 | 3/1965 | Drapeau | 236—34.5 |

EDWARD J. MICHAEL, *Primary Examiner.*